United States Patent
Nijjer

(10) Patent No.: US 9,223,876 B2
(45) Date of Patent: *Dec. 29, 2015

(54) OPTIMIZING SEARCH ENGINE RANKING BY RECOMMENDING CONTENT INCLUDING FREQUENTLY SEARCHED QUESTIONS

(71) Applicant: Go Daddy Operating Company, LLC, Scottsdale, AZ (US)

(72) Inventor: Rajinder Nijjer, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,095

(22) Filed: Dec. 9, 2014

(65) Prior Publication Data

US 2015/0088850 A1    Mar. 26, 2015

Related U.S. Application Data

(63) Continuation of application No. 13/650,066, filed on Oct. 11, 2012, now Pat. No. 8,938,438.

(51) Int. Cl.
*G06F 17/30* (2006.01)
*H04L 29/06* (2006.01)

(52) U.S. Cl.
CPC .......... *G06F 17/30864* (2013.01); *H04L 63/08* (2013.01); *G06F 17/3053* (2013.01); *G06F 17/30616* (2013.01); *G06F 17/30861* (2013.01); *G06F 17/30899* (2013.01)

(58) Field of Classification Search
CPC .................. G06F 17/30864; G06F 17/30616; G06F 17/30861; G06F 17/30899; G06F 17/3053

USPC .................................. 707/706, 748, 749, 750
See application file for complete search history.

(56) References Cited

U.S. PATENT DOCUMENTS

| | | |
|---|---|---|
| 6,453,347 B1 | 9/2002 | Revashetti et al. |
| 7,363,296 B1 | 4/2008 | Naam et al. |
| 7,565,630 B1 | 7/2009 | Kamvar et al. |
| 7,620,725 B2 | 11/2009 | King et al. |
| 7,693,827 B2 | 4/2010 | Zamir et al. |

(Continued)

OTHER PUBLICATIONS

Like a Match.com for Search Marketers, Linker Facilitates Relevant Link Exchanges, TechCrunch Article, Jun. 23, 2010.

(Continued)

*Primary Examiner* — Rehana Perveen
*Assistant Examiner* — Tiffany Thuy Bui
(74) *Attorney, Agent, or Firm* — Quarles & Brady LLP

(57) ABSTRACT

Systems and method of the present invention provide for one or more server computers configured to receive one or more keywords topically relevant to a content of a web page, request from a search engine a first metric comprising a quantity of times the keywords have appeared in a search query with one or more question keywords during a time period and a second metric comprising a probability of receiving a high rank associated with the one or more keywords and the one or more question keywords, receive, from the search engine, the first metric and the second metric, calculate a keyword effectiveness index from the first metric and the second metric, and generate and transmit to a client computer one or more recommendations to include a high ranked suggested content on the web page according to the keyword effectiveness index.

18 Claims, 6 Drawing Sheets

(56) References Cited

U.S. PATENT DOCUMENTS

| | | |
|---|---|---|
| 7,734,631 B2 | 6/2010 | Richardson et al. |
| 8,271,488 B2 | 9/2012 | Murashige et al. |
| 8,370,365 B1 | 2/2013 | Christian et al. |
| 2003/0004773 A1 | 1/2003 | Clark et al. |
| 2003/0050863 A1 | 3/2003 | Radwin |
| 2003/0195837 A1 | 10/2003 | Kostic et al. |
| 2004/0243568 A1* | 12/2004 | Wang et al. ................ 707/3 |
| 2005/0038814 A1 | 2/2005 | Iyengar et al. |
| 2005/0038894 A1 | 2/2005 | Hsu et al. |
| 2005/0060168 A1 | 3/2005 | Murashige et al. |
| 2005/0108325 A1 | 5/2005 | Ponte |
| 2005/0198268 A1 | 9/2005 | Chandra |
| 2007/0005564 A1 | 1/2007 | Zehner |
| 2007/0185855 A1 | 8/2007 | Shah et al. |
| 2007/0203906 A1* | 8/2007 | Cone et al. ................ 707/6 |
| 2007/0239680 A1 | 10/2007 | Oztekin et al. |
| 2007/0299815 A1 | 12/2007 | Starbuck et al. |
| 2008/0215429 A1 | 9/2008 | Ramer et al. |
| 2008/0222130 A1 | 9/2008 | Patel et al. |
| 2010/0030770 A1* | 2/2010 | Cao et al. ................ 707/5 |
| 2010/0169356 A1* | 7/2010 | Malden et al. ................ 707/767 |
| 2010/0306832 A1 | 12/2010 | Mu et al. |
| 2011/0238665 A1* | 9/2011 | Parikh et al. ................ 707/740 |
| 2013/0046747 A1* | 2/2013 | Gouyet et al. ................ 707/709 |
| 2013/0066819 A1* | 3/2013 | Nice et al. ................ 706/14 |
| 2013/0091142 A1* | 4/2013 | Joseph et al. ................ 707/748 |
| 2013/0144890 A1* | 6/2013 | Liu ................ 707/749 |
| 2013/0151496 A1* | 6/2013 | Jacobs et al. ................ 707/706 |
| 2013/0191377 A1* | 7/2013 | Zelevinsky et al. ........... 707/723 |
| 2013/0275164 A1* | 10/2013 | Gruber et al. ................ 705/5 |
| 2014/0108369 A1 | 4/2014 | Nijjer |

OTHER PUBLICATIONS

"Eightfold Logic Intends to Link Up Potential Business Partners," Search Engine Watch Article, Jun. 23, 2010.

"Eightfold Logic Reinvents Linking to Maximize SEO Results—'Linker' Gives Businesses Easy and Meaningful Ways to Link and Be Found," Marketwire Article, Jun. 23, 2010.

Feb. 2, 2011 screenshots from www.linker.eightfoldlogic.com website.

Keywords—the Most Important Item in SEO, Mar. 23, 2007, pp. 1-4.

* cited by examiner

| SEARCH ENGINE VISIBILITY CONTROL PANEL: WWW.ALLERGYCLINIC.COM! |
|---|

File  Edit  Options  Window  Help www.allergyclinic.com      << Previous Page    Next Page >>
http://www.allergyclinic.com  view page     All Finished

| Keywords Being Searched    Switch to Suggested Content | Optimization Options |
|---|---|
| Keywords or phrases that describe this page: Use commas to separate many keywords entered at once | Generate Keywords/Topics Analyze Content Optimize Tags Control Crawling Create Site Map |
| allergy | |
| Geo: United States, Lang. English   Edit | |

| | Folders/Pages |
|---|---|
| Keywords from Search Engine 1 | www.allergyclinic.com allergy_articles education_info about.php allergist.php awards.php clinical.php contactus.php doctors.php education.php |

| Keyword | Recommendation | | |
|---|---|---|---|
| allergies | 6.1 | ☆ | + |
| what are allergies | 6.1 | ☆ | + |
| food allergy | 5.1 | ☺ | + |
| allergy symptoms | 5.1 | ☺ | + |
| symptoms of allergies | 5.1 | ☺ | + |
| allergy and asthma | 4.8 | ⊘ | + |
| allergy test | 4.6 | ⊘ | + |

Saved Keywords*

[_____] + x
[_____] + x
[_____] + x
[_____] + x
[_____] + x
[_____] + x
[_____] + x
[_____] + x

*Keywords may be added using the + or removed using the x. defined keywords apply to the selected page and are saved for use in other sections.

+ Keywords from Search Engine 2

+ Keywords from Search Engine 3

FIG. 4

| SEARCH ENGINE VISIBILITY CONTROL PANEL: WWW.ALLERGYCLINIC.COM! | |
|---|---|
| File  Edit  Options  Window  Help | ⇐ ⇒ | www.allergyclinic.com                    << Previous Page      Next Page >>
http://www.allergyclinic.com  view page                           All Finished

| Suggested Content      Switch to Keywords Being Searched | Optimization Options |
|---|---|
| Keywords or phrases that describe this page: Use commas to separate many keywords entered at once | Generate Keywords/Topics Analyze Content Optimize Tags Control Crawling Create Site Map |
| allergy | |
| Geo: United States, Lang. English      Edit | Folders/Pages |
| Search Questions from Search Engine 1 | ☐ www.allergyclinic.com ☐ allergy_articles ☐ education_info ☐ about.php ☐ allergist.php ☐ awards.php ☐ clinical.php ☐ contactus.php ☐ doctors.php ☐ education.php |
| Searched Question          Recommendation 1. what is an allergy         6.1 ▽      ☆ + 2. what are allergies         6.1 ▽      ☆ + 3. what causes allergies      5.1 ▽      ☺ + 4. how to treat for allergies 5.1 ▽      ☺ + 5. where are allergies highest 5.1 ▽     ☺ + 6. when is allergy season     4.8 ▽      ⊘ + 7. what herbs help allergies  4.6 ▽      ⊘ + | |
| | Saved Keywords* |
| People are using the searches above for sites like yours. Writing articles or blog posts on your site that target these searches will improve search engine optimization (SEO) performance. | ☐ + x ☐ + x ☐ + x ☐ + x ☐ + x ☐ + x ☐ + x ☐ + x |
| + Searched Questions from Search Engine 2 | |
| + Searched Questions from Search Engine 3 | *Keywords may be added using the + or removed using the x. defined keywords apply to the selected page and are saved for use in other sections. |

FIG. 5

| SEARCH ENGINE VISIBILITY CONTROL PANEL: WWW.ALLERGYCLINIC.COM! | | |
|---|---|---|
| File  Edit  Options  Window  Help | | | www.allergyclinic.com  << Previous Page    Next Page >>
http://www.allergyclinic.com  view page    All Finished

Generate Keywords -

1. Select a page to compare against competitors http://www.allergyclinic.com/default.php 2. Select up to 10 competitors, found in top search results with similar content

- http://www.competitor1.com/product.php
   - http://www.competitor2.com/product.php
   - http://www.competitor3.com/product.php
   - http://www.competitor4.com/product.php
   - http://www.competitor5.com/product.php
   - http://www.competitor6.com/product.php
   - http://www.competitor7.com/product.php
   - http://www.competitor8.com/product.php
   - http://www.competitor9.com/product.php
   - http://www.competitor10.com/product.php 3. Add returned and selected keywords to saved keywords

| Keyword Returned | Count | |
|---|---|---|
| allergies | 16 | + |
| food allergies | 11 | + |
| allergy symptoms | 10 | + |
| symptoms of allergies | 9 | + |
| what are allergies | 8 | + |
| allergy and asthma | 7 | + |
| allergy test | 7 | + |
| allergies | 7 | + |
| allergies | 7 | + |

Optimization Options

Generate Keywords/Topics
Analyze Content
Optimize Tags
Control Crawling
Create Site Map

Folders/Pages

- ☐ www.allergyclinic.com
- ☐ allergy_articles
- ☐ education_info
- ☐ about.php
- ☐ allergist.php
- ☐ awards.php
- ☐ clinical.php
- ☐ contactus.php
- ☐ doctors.php
- ☐ education.php

Saved Keywords*

[          ] + x
[          ] + x
[          ] + x
[          ] + x
[          ] + x
[          ] + x
[          ] + x
[          ] + x

*Keywords may be added using the + or removed using the x. defined keywords apply to the selected page and are saved for use in other sections.

FIG. 6

| SEARCH ENGINE VISIBILITY CONTROL PANEL: WWW.ALLERGYCLINIC.COM! | | |
|---|---|---|

File  Edit  Options  Window  Help www.allergyclinic.com  << Previous page   Next Page >>
http://www.allergyclinic.com  view page   All Finished

How you want to be seen

| Your Keywords | Count | Density | |
|---|---|---|---|
| allergies | 1 | 0.27% ▽ | Too few |
| allergy test | 0 | 0.00% ▽ | Too few |
| peanut allergies | 0 | 0.00% ▽ | Too few |
| food allergy | 0 | 0.00% ▽ | Too few |

How search engines see you  How do I improve this?

| 3 Keywords | 2 Keywords | 1 Keyword |

| Your Keywords | | Count | Density |
|---|---|---|---|
| our allergy doctor | + Save Keyword | 3 | 0.82 |
| with respect and | + Save Keyword | 2 | 0.55 |
| with integrity and | + Save Keyword | 2 | 0.55 |
| we pledge to | + Save Keyword | 2 | 0.55 |
| treat our patients | + Save Keyword | 2 | 0.55 |
| to provide high | + Save Keyword | 2 | 0.55 |
| respect and consideration | + Save Keyword | 2 | 0.55 |

Optimization Options

Generate Keywords
Analyze Content
Optimize Tags
Control Crawling
Create Site Map

Folders/Pages

☐ www.allergyclinic.com
☐ allergy_articles
☐ education_info
☐ about.php
☐ allergist.php
☐ awards.php
☐ clinical.php
☐ contactus.php
☐ doctors.php
☐ education.php

Saved Keywords*

[_____] + x
[_____] + x
[_____] + x
[_____] + x
[_____] + x
[_____] + x
[_____] + x
[_____] + x

*Keywords may be added using the + or removed using the x. defined keywords apply to the selected page and are saved for use in other sections.

FIG. 7

OPTIMIZING SEARCH ENGINE RANKING BY RECOMMENDING CONTENT INCLUDING FREQUENTLY SEARCHED QUESTIONS

CROSS-REFERENCE TO RELATED APPLICATIONS

This application is a continuation of U.S. patent application Ser. No. 13/650,066, filed on Oct. 11, 2012, now U.S. Pat. No. 8,938,438 issued on Jan. 20, 2015, and entitled "Optimizing Search Engine Ranking by Recommending Content Including Frequently Searched Questions."

FIELD OF THE INVENTION

The present inventions generally relate to search engine optimization and, more particularly, methods and systems for improving a website administrator's (or other user's) search engine optimization rankings by recommending frequently searched keywords and questions to be included in a web page content.

SUMMARY OF THE INVENTION

An example embodiment of method of optimizing search engine rankings by recommending content for frequently searched questions may comprise the steps of one or more server computers receiving one or more keywords topically relevant to a content of a web page within a website hosted on the server computer, requesting from a search engine a first metric comprising a quantity of times the one or more keywords have appeared in a search query along with one or more question keywords during a time period and a second metric comprising a probability of receiving a high rank associated with the one or more keywords and the one or more question keywords. The one or more server computers may then receive from the search engine, the first metric and the second metric, calculate a keyword effectiveness index from the first metric and the second metric, and generate and transmit to a client computer one or more recommendations to include a high ranked suggested content on the web page according to the keyword effectiveness index.

An example embodiment of system for optimizing search engine rankings by recommending content for frequently searched questions may comprise one or more server computers communicatively coupled to a network and configured to receive one or more keywords topically relevant to a content of a web page within a website hosted on the server computer, request from a search engine a first metric comprising a quantity of times the one or more keywords have appeared in a search query along with one or more question keywords during a time period and a second metric comprising a probability of receiving a high rank associated with the one or more keywords and the one or more question keywords. The one or more server computers may be further configured to receive from the search engine, the first metric and the second metric, calculate a keyword effectiveness index from the first metric and the second metric, and generate and transmit to a client computer one or more recommendations to include a high ranked suggested content on the web page according to the keyword effectiveness index.

The above features and advantages of the present inventions will be better understood from the following detailed description taken in conjunction with the accompanying drawings.

BRIEF DESCRIPTION OF THE DRAWINGS

FIG. 4 is an example interface illustrating a possible embodiment of a system and method of optimizing search engine rankings by recommending content for frequently searched keywords.

FIG. 5 is an example interface illustrating a possible embodiment of a system and method of optimizing search engine rankings by recommending content for frequently searched keywords.

FIG. 6 is an example interface illustrating a possible embodiment of a system and method of optimizing search engine rankings by recommending content for frequently searched keywords.

FIG. 7 is an example interface illustrating a possible embodiment of a system and method of optimizing search engine rankings by recommending content for frequently searched keywords.

DETAILED DESCRIPTION

Figure 1:
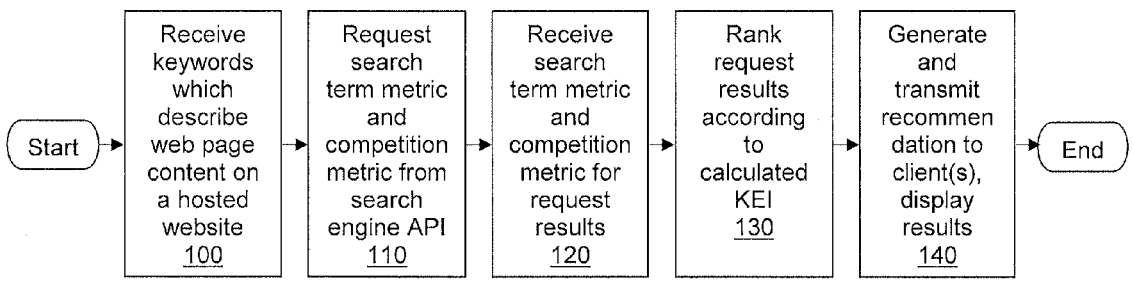
FIG. 1 is a flow diagram illustrating a possible embodiment of a method of optimizing search engine rankings by recommending content for frequently searched keywords.

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as web pages. Websites comprise a collection of connected, or otherwise related, web pages. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Menus and links may be used to move between different web pages within the website or to move to a different website as is known in the art. The interconnectivity of web pages enabled by the Internet can make it difficult for Internet users to tell where one website ends and another begins. Websites may be created using HyperText Markup Language (HTML) to generate a standard set of tags that define how the web pages for the website are to be displayed. Such websites may comprise a collection of HTML and subordinate documents (i.e., files) stored on the Web that are typically accessible from the same Uniform Resource Locator (URL) and reside on the same server, although such files may be distributed in numerous servers.

Users of the Internet may access content providers' websites using software known as an Internet browser, such as GOOGLE CHROME, MOZILLA FIREFOX or MICROSOFT INTERNET EXPLORER. After the browser has located the desired webpage, it requests and receives information from the webpage, typically in the form of an HTML document, and then displays the webpage content for the user. The user then may view other web pages at the same website or move to an entirely different website using the browser.

Website owners and/or administrators often use their websites for business purposes, selling a wide range of goods and services as well as displaying paid advertisements. In order to increase revenue, website owners try to attract additional Internet users (i.e., customers) to their websites. However, with an ever increasing number of websites on the Internet, website owners are finding it increasingly difficult to attract customers to their websites. This trend is likely to continue as the number of businesses trying to gain a presence on the Internet increases the competition for the attention of the Internet users. The future level of success for many of these businesses will depend on their ability to attract Internet users, i.e., customers, to their websites.

Web sites are predominantly found by Internet users through the use of a search engine or directory. Some of the more widely used search engines are, for example, GOOGLE, YAHOO, BING, etc. Internet users are able to enter a search phrase comprised of one or more keywords or a phrase, typically a name of a good or service or a topic of interest, into a search engine. The search engine will display a list of websites (a result list) that the search engine has determined are related to the search phrase along with links to the websites. The search engines display the result list in a particular order or rank, often determined by relevance. In other words, the websites which the search engine has determined have content most closely related to the search keyword or phrase are displayed near the top of the result list, while websites with less closely related content are displayed lower in the result list. The sheer number of websites currently on the Internet can often result in the result list having multiple pages of websites related to many common search phrases.

In an effort to increase traffic flow to their website, website owners and/or administrators typically register their websites with one or more search engines. The search engines may try to determine the search phrases that are related to each submitted website. The methods used by the search engines vary from search engine to search engine and each search engine typically keeps its exact methodology a secret. In general though, most search engines parse through the various parts of the websites submitted to them for registration. The keywords and phrases that are discovered by parsing the submitted websites are used to determine if a website should be cited based on the search phrase entered by Internet users.

Not surprisingly, website owners and administrators have noticed that websites listed near the beginning of a result list receive substantially more traffic than websites listed near the end of a result list. It is therefore important not only for a website to be on the result list generated by the search engines, but to also be listed as high as possible on that result list.

In an effort to raise the rank of their websites on the result lists, a website owner and/or administrator ("website admin") may alter their website(s) so that search engines are more likely to determine that their websites are more relevant to any searched keywords or phrases. However, few website administrators are familiar with, and likely don't want to spend the time to learn, all of the factors used in the search engines' algorithms and are thus unable to take advantage of all the beneficial alterations that they could be making. Further, operators of search engines, being aware of the common tactics used by a website admin to artificially raise their search engine rank, adjust their algorithms to counter these efforts.

Applicant has therefore determined that presently-existing systems and methods do not provide optimal means for recommending changes to website content which will improve search engine rankings. New systems and processes are therefore needed to assist website owners in submitting their websites to a large number of search engines and to get their websites listed as high as possible on the result lists generated by the search engines.

FIG. 1 illustrates a non-limiting example embodiment of a method of optimizing search engine rankings by recommending content for frequently searched keywords. This method may include the steps of one or more server computers hosting a website, and receiving one or more keywords that describe a content of a web page within the website (Step 100). The server(s) may then be authenticated to an application programming interface (API) for a search engine and may request, via a remote procedure call to the API, both a search term metric comprising a quantity of searches including the one or more keywords which were performed during a regular interval, and a competition metric comprising a measurement of difficulty to receive a high search engine rank for a webpage content comprising the one or more keywords (Step 110).

The server(s) may receive one or more request results from the search engine via the API, with each of the request results comprising the search term metric and the competition metric for the one or more keywords (Step 120). The server(s) may use the search term metric and the competition metric to calculate a keyword effectiveness index (KEI) for each of the request results and the request result(s) may be ranked according to the KEI (Step 130). The server(s) may then generate and transmit to one or more client computers, communicatively coupled to the network, one or more recommendations to optimize a search engine ranking for the selected web page. The recommendation may be to include the keywords generated by the request results in the content of the selected web page. The recommendations may be ordered and displayed according to the KEI acting as a "recommendation score," where a keyword with a higher KEI may be recommended above a keyword with a lower KEI (Step 140).

Figure 2:
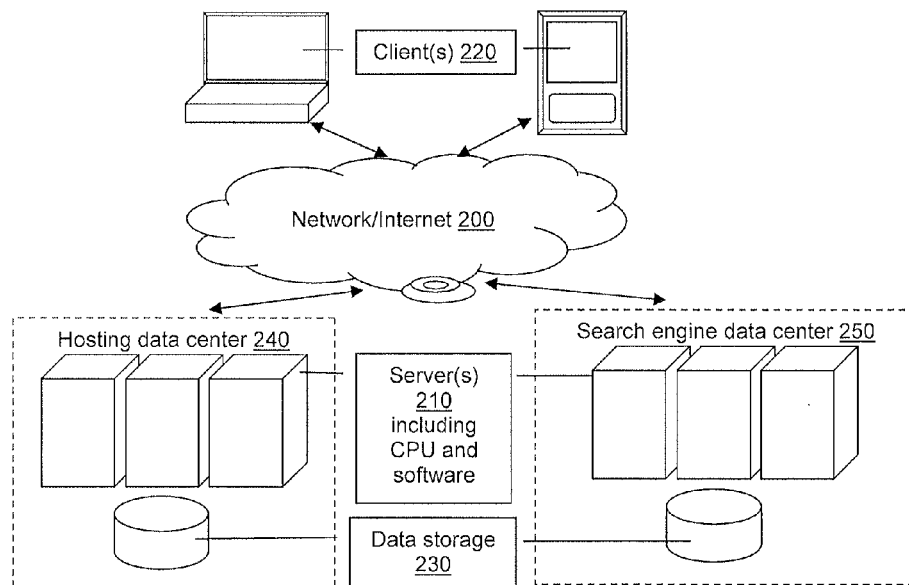
FIG. 2 illustrates a possible embodiment of a system for optimizing search engine rankings by recommending content for frequently searched keywords.
Figure 3:
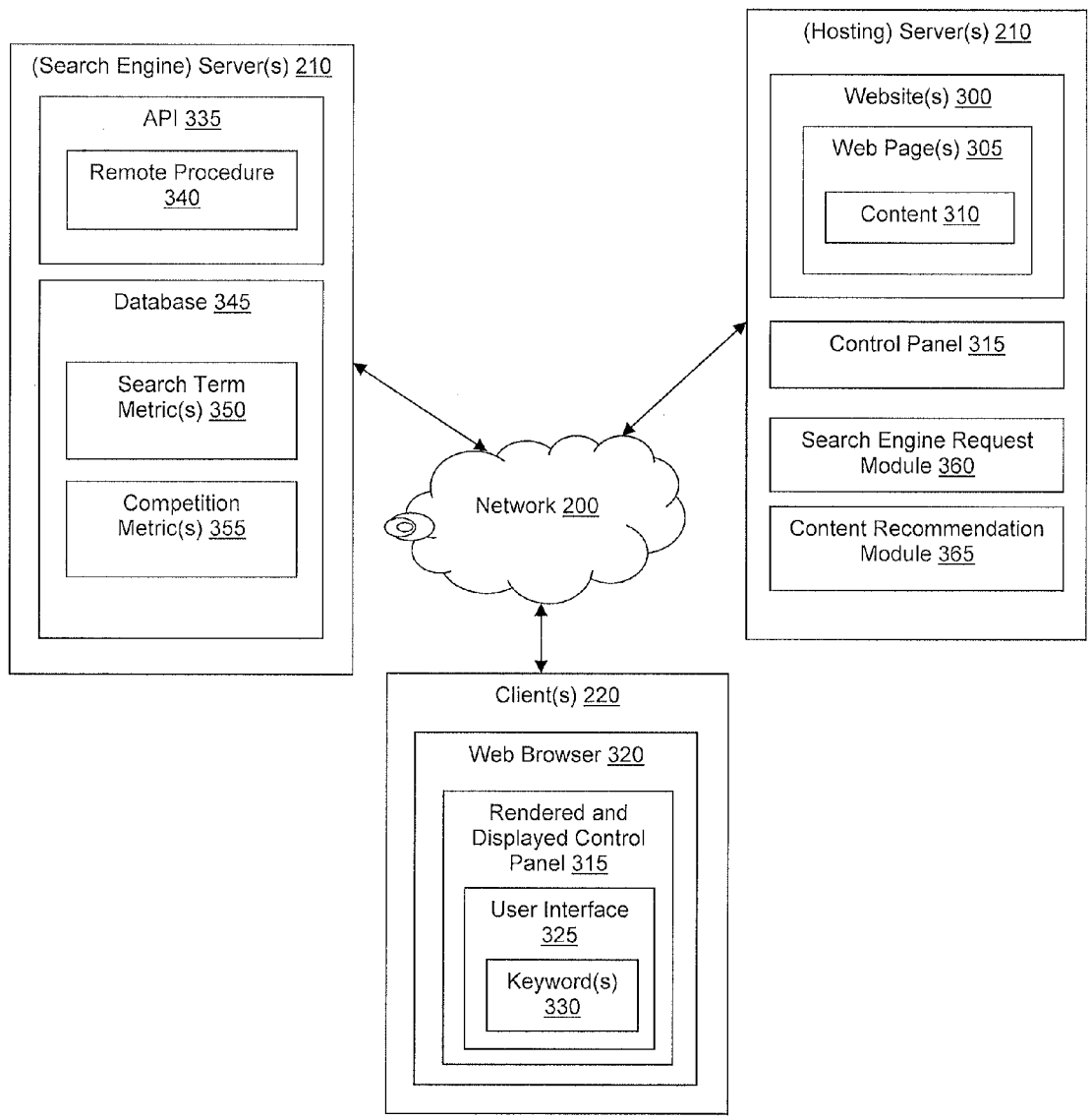
FIG. 3 illustrates a more detailed possible embodiment of a system for optimizing search engine rankings by recommending content for frequently searched keywords.

FIG. 2 illustrates a streamlined embodiment and FIG. 3 illustrates a more detailed embodiment of a system for accomplishing the method steps disclosed herein. The system may comprise one or more servers 210 hosted in one or more data centers such as a data center for a hosting provider 240 and a data center for one or more search engines 250. The server(s) 210 may therefore include hosting servers and search engine servers as seen in FIG. 3. The server(s) 210 may store and/or be communicatively coupled with data storage 230, which may include one or more databases and additional data, such as files, website files, multimedia files, software modules, backups, etc. The server(s) 210, data storage 230 and one or more clients 220, may be communicatively coupled to a network 200.

The example embodiments illustrated herein place no limitation on network 200 configuration or connectivity. Thus, as non-limiting examples, the network 200 could comprise the Internet, the public switched telephone network, the global Telex network, computer networks (e.g., an intranet, an extranet, a local-area network, or a wide-area network), wired networks, wireless networks, or any combination thereof.

System components may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

Any transmissions or data transfers described herein may be transmitted according to any data transmission protocol known in the art or developed in the future including, but not limited to an HTTP response to the request, a file transfer protocol (FTP) transmission, an email message, and/or a SMS message. Data streaming technology also may be used to effectuate data transfer. A data stream may be, for example, a sequence of digitally encoded coherent signals (packets of data) used to transmit or receive information that is in transmission.

Any data transfer protocol known in the art or developed in the future may be used including, but not limited to: those used with TCP/IP (e.g., FTAM, FTP, HTTP, RCP, SFTP, SCP, or FASTCopy); those used with UDP (e.g., TFTP, FSP, UFTP, or MFTP); those used with direct modem connections; HTTP streaming; Tubular Data Stream Protocol (TDSP); Stream Control Transmission Protocol (SCTP); and/or Real Time Streaming Protocol (RTSP).

Server(s) 210 (and/or any other server described herein) may comprise any computer or program that provides services to other computers, programs, or users either in the same computer or over a computer network 200. As non-limiting examples, the server(s) 210 could be application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, or any combination thereof).

Server(s) 210 may comprise a computer-readable storage media storing instructions that, when executed by a microprocessor, cause the server 210 to perform the steps for which it is configured. Such computer-readable media may comprise any data storage medium capable of storing instructions for execution by a computing device. It may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage. The instructions may, as non-limiting examples, comprise software and/or scripts stored in the computer-readable media that may be stored locally in the server 210 or, alternatively, in a highly-distributed format in a plurality of computer-readable media accessible via the network 200, perhaps via a grid or cloud-computing environment.

Such instructions may be implemented in the form of software modules. Each module described herein may comprise a self-contained software component that may interact with the larger system and/or other modules. A module may comprise an individual (or plurality of) file(s) and may execute a specific task within a larger software and/or hardware system. As a non-limiting example, a module may comprise any software and/or scripts running on one or more servers 210 containing instructions (perhaps stored in computer-readable media accessible by the server computer's computer processor) that, when executed by the computer processor, cause the server computer to perform the steps for which it is configured.

Any database/data storage 230 described herein may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future.

The client(s) 220 may be any computer or program that provides services to other computers, programs, or users either in the same computer or over a computer network 200. As non-limiting examples, the client(s) 220 may be an application, communication, mail, database, proxy, fax, file, media, web, peer-to-peer, or standalone computer, cell phone, "smart" phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex, Silverlight, any programming environments for mobile "apps," or any combination thereof.

Client software may be used for authenticated remote access to one more hosting computers or servers 210, described herein. These may be, but are not limited to being accessed by a remote desktop program and/or a web browser, as are known in the art. Any browser described herein may comprise any software application for retrieving, presenting, and traversing information resources on the Web including, but not limited to, the website(s) 300 described in detail herein.

The website(s) 300 may comprise any collection of data and/or files accessible to a client 220 or server 210 communicatively coupled to the network 200. As a non-limiting example, websites 300 may comprise a single web page or multiple interconnected and related web pages 305, resolving from a domain name, each of which may provide access to static, dynamic, multimedia, or any other content, perhaps by accessing files (e.g., text, audio, video, graphics, executable, HTML, eXtensible Markup Language (XML), Active Server Pages (ASP), Hypertext Preprocessor (PHP), Flash files, server-side scripting, etc.) that enable the website 300 to display when rendered by a browser 320 on a client 220 or server 210. The website's 300 files may be organized in a hosting server's 210 file system, which may organize the files for the storage, organization, manipulation, and retrieval by the hosting server's 210 operating system. A hosting server's 210 file system may comprise at least one directory, which in turn may comprise at least one folder in which files may be stored. In most operating systems, files may be stored in a root directory, sub-directories, folders, or sub-folders within the file system.

An administrator and/or owner of a website 300 may use the client(s) 220 and any related web browser 320 or other client software to display the control panel 315 used to optimize search engine rankings for a web page 305 by recommending content which includes frequently searched and/or highly ranked search engine keywords. Although the term "website admin" is used in the disclosed non-limiting example embodiments, any user authorized to access a hosting account for the website 300, control panel 315, website(s) 300, and/or web page(s) 305 described herein may likewise access the website control panel 315 after authentication.

The website admin may be authenticated to log into the control panel 315 and/or the website 300 (possibly via a hosting account for the website 300) using the client(s) 220. The server(s) 210 may authenticate the user by any means of authentication known in the art and/or by any other means of verifying the identity of the sender of a communication, such as a request to log in or access a resource. The thing being authenticated may be, but is not limited to, a person using a client 220 or other system, a computer itself, or a computer program.

As non-limiting examples, authentication may utilize any weak or strong authentication system known in the art or developed in the future, such as username/password, challenge/response, OpenID, MICROSOFT CARDSPACE, any Single Sign-On (SSO) methodology, Public Key Infrastructure (PKI), digital signatures, zero-knowledge proofs, Kerberos, smart card, biometrics (retina, voice, fingerprint, or DNA recognition) and/or and combination thereof. The authentication environment may further be secured with anti-virus software, firewalling and/or at least one virtual private network.

In some embodiments, the server(s) 210 may authenticate the user via an administrator username and password used to log into a hosting account for the website 300. In these and other embodiments, the control panel 315 may be included as part of the website hosting account. The server(s) 210 may execute any method steps disclosed herein, render the control panel 315 and transmit the rendered control panel 315 for display on the client computer 220 operated by the website admin.

FIGS. 4-7 show example user interfaces 325 for such a control panel 315. The control panel 315 may comprise a web-based and/or desktop-based graphical user interface 325 used by the website admin to optimize the website 300 for high search engine ranking. This control panel 315 may be a computer user interface 325 which utilizes a control panel metaphor to allow the user to control software and hardware features.

The user interfaces 325 displayed on the client(s) 210 and/or the server(s) 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces, including Touch interfaces, Conversational Interface Agents, Live User Interfaces (LUI), Command line interfaces, Non-command user interfaces, Object-oriented User Interfaces (OOUI) or Voice user interfaces. Any information generated by the user, or any other information, may be accepted using any field, widget and/or control used in such interfaces, including but not limited to a text-box, text field, button, hyper-link, list, drop-down list, check-box, radio button, data grid, icon, graphical image, embedded link, etc. The control panel 315 may comprise one or more "admin" web pages 305.

As seen in the non-limiting example embodiment seen in FIG. 4, the user interface 325 may include an "Optimization Options" section of the control panel 315. This section may include links or other navigation for the website admin to access the disclosed functionality to Generate Keywords and/or Topics and to Analyze Content on the website. Additional features may include navigation for the website admin to Optimize Tags on the website 300, Control Crawling of the website 300, Create a Site Map for the website 300, etc.

As seen in the top navigation of the non-limiting example embodiments in FIGS. 4-7, the control panel 315 may include a top navigation used to view a web page 305 and/or one or more websites 300 in a web browser 320 and/or to view the control panel 315 for additional web pages 305 and/or websites 300. The control panel 315, as seen in FIGS. 4-7, may also include a "Folders/Pages" section. This section may include a window or panel for viewing the web page(s) 305 and/or folders included within the website(s) 300. In these non-limiting example embodiments, such a window or panel may include a "drill down" or "tree" view of these web pages 305/folders within the website(s) 300. In other embodiments, the window or panel may include a list view, or an option to view the contents 310 of the website 300 by a list view.

This window or panel may include the "root" of the website 300, any default pages (e.g., "default.html," "main.asp," "home.php," etc.), any content 310 pages, either static or dynamic, folders for the website 300, multimedia files, etc. The website admin may use such windows or panels to view information and/or accomplish the method steps described herein for each of the websites 300 and/or individual web pages 305 within these websites 300, ideally in the context of optimizing the website 300 and/or web pages 305 for high search engine rank.

As a specific non-limiting example seen in FIGS. 4-7, a website admin for the website "www.alergyclinic.com" may be authenticated and granted access to the control panel 315 for this website 300. The control panel 315 may allow the website admin to navigate to the default web page 305 for alergyclinic.com in order to optimize the content 310 of this web page 305 for high search engine rank. The website admin may use the "Folders/Pages" window/panel, in this example, to view and/or select web pages 305 and folders included within the alergyclinic.com website for optimization. In this example, web pages 305 and folders may include about.php, allergist.php, awards.php, clinical.php, contactus.php, doctors.php, education.php, etc. The window or panel may also include folders for supporting files, such as education_info or allergy_articles.

The website admin may also use the control panel 315, as seen in FIGS. 4-7, to store a fixed number of keywords used to optimize the selected web page 305 and/or website 300 for high search engine rank. These keywords may be included in web page content 310, as well as metadata tags and/or any other technique known in the art for using keywords to optimize search engine rankings. These keywords may either be added manually, or added in response to receiving one or more suggested keywords as seen in FIGS. 4-6 and described in detail herein. In the example embodiments seen in FIGS. 4-7, manual or suggested keywords may be added using a "+" and removed using an "x."

To generate such suggested keywords and/or content 310, the website admin may use the previously disclosed navigation elements to select and review the content 310 of a selected web page 305 within a selected website 300 and may identify one or more keywords 330 which both describe the web page 305, and which the website admin has decided should be used to optimize the web page 305 for high search engine rank. For purposes of this disclosure, keywords 330 may include any combination of one or more individual words or phrases. The website admin may enter the keyword(s) 330 into a text area provided within a specialized area of the user interface 325 of the control panel 315 configured to receive the keywords 330 which describe the content 310 of the selected web page 305 within the selected website 300.

In some embodiments, this text box may include a parsing feature so that the server(s) 210 may distinguish between selected individual keywords 330 and selected keywords 330 grouped as phrases within the request made by the website admin. In some embodiments, such as those seen in FIGS. 4-5, the user interface 325 may include user interface elements presenting options for the website administrator to limit the request for information by geographic regions in which searches for the selected word is being searched (e.g., United States), or the language in which the selected word is being searched (e.g., English).

As a non-limiting example seen in FIG. 4, the website admin for the website allergyclinic.com may use the provided control panel 315 navigation to select the default page as the web page 305 to be optimized for high search engine rank and may further determine that the keyword 330 which best describes the default page for optimization purposes is "allergy." The website admin may then select "Generate Keywords/Topics" from the presented Optimization Options on the control panel 315.

In the non-limiting example interface seen in FIGS. 4-5, the website admin may be presented with two options for generating keywords/topics: namely an option for "Keywords Being Searched" and an option for "Suggested Content." In FIGS. 4-5, the website admin may move back and forth between these options using an interface element such as the disclosed link. However, any other interface element (e.g., button, tab, drop down, checkbox, radio button etc.) may be used to select between these two options. In FIG. 4, the website admin has selected the "Keywords Being Searched" option.

In this illustrated example, the website admin may enter the selected word 330 "allergy" into the provided textbox. If additional keywords and/or phrases 330 had been selected, the website admin may have separated them by commas, semicolons, etc. In the illustrated embodiment, the user may hit the "Enter" or "Return" key on the keyboard to request search engine optimization information, possibly including suggested content changes, from the server(s) 210 for the suggested keyword 330 "allergy." In other embodiments, the website admin may make this request by selecting a select button (possibly labeled "Generate" indicating that the website admin wants the system to generate suggested/recommended content for the web page). The control panel may then collect the selected keyword "allergy" and any other information required for the request, and transmit the request, including the keyword(s) 330 and other information to the server(s) 210.

As seen in FIG. 3, the server(s) 210 may comprise a search engine request module 360 and a content recommendation module 365. The search engine request module 360 may be configured to receive the request, including the keyword(s) 330 and any additional information (Step 100). The search engine request module 360 on the server(s) 210 may identify and analyze the keyword(s) 330 and any additional information, and generate a request to call and run a remote procedure 340 within an application programming interface (API) 335 for each of one or more search engines.

This remote procedure 340 call may be configured to receive the request and generate and transmit search engine information about the keyword(s) 330 to the hosting server(s) 210. In generating the request, the hosting server(s) 220 may be further configured to customize the request so that the generated search information is limited not only by the selected keyword(s) 330 but also by additional request parameters including, as non-limiting examples, the question keywords as defined and described herein and the selected geographic region and/or language in which the keywords 330 are being searched as described above. The information requested from the search engine may include at least two keyword 330 search metrics related to search engine optimization.

The first metric requested may include a search term metric 350 identifying a quantity of searches during a regular interval such as a day, week, month, year, etc. which include the one or more keyword(s) 330. The second metric requested may be a competition metric 355 which measures a level of difficulty involved in receiving a high search engine rank because of additional websites optimized for the same keyword(s) 330.

Continuing the example embodiment seen in FIG. 4, the search engine request module 360 on the server(s) 210 may receive the request for information for the keyword "allergy" (Step 100), generate a request for the search engine information, including the search term metric 350 and the competition metric 355, for the keyword "allergy" (and as limited by other selected options, e.g., question keywords, geographic region, language, etc.) and submit the request via a remote procedure 340 call to the API 335 for the search engine (Step 110). The remote procedure 340 may execute the request (possibly by accessing the requested search engine information as stored in a database 345 on the search engine servers 210), compile the results according to limiting parameters, if any, and return the compiled results to the hosting server(s) 210.

The API 335 may comprise a service made available by the search engine to third parties, which may further comprise any individual, entity, system, hardware, or software wishing to access the disclosed search engine and optimization information. Such an API 335 may comprise a software-to-software interface that specifies the protocol defining how independent computer programs interact or communicate with each other.

The API 335 may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof. The API 335 may comprise computer-readable code that, when executed, causes the API 335 to receive a procedure 340 call (i.e., function call) requesting search engine information services. Responsive to receipt of the remote procedure 340 call, the API 335 may perform the above described processes, and transmit a request results to the requesting third party, in this case, the search engine request module 360 on the hosting server 210.

To submit the request via the remote procedure 340 call to the API 335, the server(s) 210 may require authentication with the search engine's API 335. As is known in the art, the server(s) 210 may locate the API 335 via an access protected URL mapped to the API 335, and may then use an API key specific to the server(s) 210 and configured to authenticate the one or more server computers 210 prior to accessing the search engine API 335.

The search engine request module 360 on the server(s) 210 may then receive the request results (Step 120) as limited by any limiting parameters. Each of these request results may include the search term metric 350 and the competition metric 355 for the request result keyword 330. As a non-limiting example, a search for the keyword "allergy" may return a plurality of request results including "allergies," "allergy testing," "gluten allergy," "allergy relief," "allergy test," "seasonal allergies," "food allergy symptoms," "allergy shots," etc. as well as the respective search term metric 350 and competition metric 355 for each of these request results.

Using the request result "allergies" as a non-limiting example response returned to the hosting server(s) 210 from a request limited to the keyword "allergy," the request result for "allergies" may include raw data indicating that 2,740,000 global monthly searches were made for "allergies." Global searches may indicate those responses which were not limited by geographic region. For responses limited by geographic region (e.g., the United States), the request result my indicate, for example, that 1,500,000 local monthly searches were made for the keyword "allergies."

The request result for the non-limiting example keyword "allergies" may also include the competition metric 355. This metric may be in any format, including a range of descriptions, such as "Low," "Medium" and "High." These range of descriptions may be determined by a numerical value in the raw data. As non-limiting examples, the numerical value for the competition metric 355 may be within a pre-determined range, such as a percentage of predetermined, limited or total searches, for example.

In the non-limiting example for a request result "allergies," the competition metric 355 may have raw data of 0.3 and may display a competition value of "low." The high, medium and low competition values may be determined according to where the competition metric 355 falls within a range of the competition metrics 355 returned with the raw data. As non-limiting examples, "allergies" may have a value of 0.3, which would be assigned and display a "low" competition value, while "allergy testing" may return a competition metric of have a value of 0.61, which may be assigned and display a competition value of "medium." "Food allergy test" may return a competition value of 0.83 and may be assigned and display a competition value of "high." It should be noted that only the numeric value in the raw data is used in the calculation of the keyword effectiveness index (KEI) described below.

The API 335 may return the request results to the server(s) 210 and the content recommendation module 365 on the server(s) 210 may analyze the raw data and calculate a KEI for each of the request results. Determination of the KEI score may be calculated by determining a logarithm comprising a calculation of the search term metric 350 for the request result multiplied by (1-the competition metric 355 for the request result). In some embodiments, the KEI may be in a range from 1-8.

If more than one request result was returned, the content recommendation module 365 on the server(s) 210 may rank the request results according to the KEI, possibly organizing the request results into a list where a request result with a higher KEI is ranked higher than a request result with a lower KEI (Step 130). Ranking the request results according to KEI and ordering the list of request results may allow request results with a higher KEI to be displayed in a more prominent position (e.g., higher within a list of displayed request results) on the control panel 315. In other words, the KEI may represent a "recommendation score" for suggested content to encourage the website admin to create and rank for organic content 310, specifically around keywords 330 that people are searching on search engines.

Once the KEI has been calculated, the content recommendation module 365 on the server(s) 210 may assign a recommendation, possibly according to the recommendation score, for including the request results in the content 310 of the selected web page 305. The recommendation(s) may be ordered according to rank, so that a request result with a higher KEI is more highly recommended than a request result with a lower KEI.

The content recommendation module 365 on the server(s) 210 may assign each KEI a "degree of recommendation" for the request result to be included in the content of the web page 305/website 300. The degree of recommendation may be determined according to a range of numbers scored by the KEI. Specifically, the KEI may be used to determine whether keywords/phrases are recommended based on whether they are higher or lower than certain threshold numbers. As non-limiting examples, in embodiments where the KEI score includes a range of 1-8, if the KEI score is greater than 4.8, it may be highly recommended. By contrast, if the KEI score is below 2.4, it may be classified as "not recommended." In this non-limiting example, if the KEI score is greater than 2.4 but less than 4.8, it may be neither "highly recommended" nor "not recommended." In some embodiments, this means the result may be recommended, but not highly recommended, or may be "neutral."

For usability purposes, the content recommendation module 365 on the server(s) 210 may then associate each degree of recommendation with a "visual indicator" of the degree of recommendation which indicates a status to the KEI assigned to the result. As non-limiting examples, the content recommendation module 365 on the server(s) 210 may associate a KEI that is "highly recommended" (KEI greater than 4.8) with a positive graphic, such as the illustrated star, or a "thumbs up," check mark, etc. "Neutral" KEI scores (KEI between 2.4 and 4.8) may be associated with a "neutral" or "less positive graphic such as the illustrated "smiley face." A KEI score that is "not recommended" (KEI below 2.4) may be associated with a negative graphic, such as that illustrated or a "thumbs down," "X," dashes, etc. Additional examples of "visual indicators" may include color coding the results so that, as non-limiting examples, results with a KEI that is "highly recommended" (KEI greater than 4.8) may be displayed in green, results with a KEI that is "neutral" (KEI between 2.4 and 4.8) may be displayed in yellow and results with a KEI that is "not recommended" (KEI below 2.4) may be displayed in red. The content recommendation module 365 on the server(s) 210 may then transmit the recommendation, ordered according to recommendation score and including the request results, KEI and any visual indicators of degree of recommendation, to the client(s) 220 for display.

The website administrator may save the highest recommended result as a target keyword(s). The website administrator may then use the target keyword(s) to optimize their website content 310 to rank higher in search results. As a non-limiting example, the website administrator may use the highest ranking result ("allergies") to add content 310 containing this keyword in as many contexts as possible. When internet users search this keyword, the web page 305 containing several references to the keyword within the website 300 may rank the website 300 and/or web page 305 higher in the search results for that search. As seen in FIG. 4, the requests and request results are not limited to a single search engine. Raw data from multiple search engines may be used to recommend suggested keywords, and the website admin may compare any number of request results from multiple search engines in determining which content to add to the website.

The non-limiting example embodiment illustrated in FIG. 5 may include any of the characteristics and functionality described herein regarding the embodiment illustrated in FIG. 4 or any other embodiment described herein. As seen in FIG. 5, the website admin has selected the user interface element for "Suggested Content" rather than "Keywords Being Searched." Like the embodiment illustrated in FIG. 4, the user interface may receive the request for search engine optimization information which includes the keyword(s) 330. The client computer 220 may transmit the request and any keyword(s) 330 or other limiting parameters to the server(s) 210, and the search engine request module 360 on the server(s) 210 may receive the request, the keyword(s) 330 and any other limiting parameters.

The search engine request module 360 on the server(s) 210 may be configured to further limit the request, in embodiments such as that seen in FIG. 5, so that not only does the request for the two metrics include request parameters for the keyword(s) 330 selected by the website admin, but may also include request parameters including one or more "question keywords" including, as non-limiting examples, "who," "what," "when," "where," "why" and "how."

As a non-limiting example, the search term metric for the quantity of searches performed during a regular interval which included the keyword(s) 330 may be further limited to include searches performed that included the keyword(s) 330 and were in the form of a question. In embodiments where the website admin selected limits by geographical area or language, the request may be further limited by the limitations included in these request parameters. The search engine request module 360 on the server(s) 210 may send the request, including the limitations, to the search engine API 335 (Step 110) and may receive the request results (Step 120) as previously described.

In the non-limiting example illustrated in FIG. 5, a search for the keyword "allergy," limited by the question keywords "who, what, when, where, how and why" may return a plurality of "searched question" request results including "what is an allergy," "what are allergies," "what causes allergies," "what is a food allergy," "what helps allergies," "why are people allergic to pollen," "how to treat allergies," "when is allergy season," etc.

Using "what is an allergy" as a non-limiting example request response returned to the search engine request module 360 on the server(s) 210 from a request limited to the keyword "allergy" and the question keyword "what," the request response may include information indicating that 4,090,000 global monthly searches were made. Global searches may indicate those responses which were not limited by geographic region. For responses limited by geographic region (e.g., the United States), the returned response may indicate, for example, that 2,240,000 local monthly searches were made for the question "what is an allergy."

The result may also include the competition metric for the non-limiting example searched question "what is an allergy." This result may be in any format, including a range of descriptions, such as "Low," "Medium" and "High" as described herein These range of descriptions may be determined by a numerical value in the raw data. As non-limiting examples, the numerical value for the competition value may be within a pre-determined range, such as a percentage of total searches, for example.

In the non-limiting example for a request result including the searched question "what is an allergy," the request result "what is an allergy" may return a competition value of 0.3 and display a competition value of "low," while "what is a food allergy" may return a competition metric of 0.45 and display competition value of "medium."

As seen in FIG. 5, the one or more request results, ordered by KEI score, and/or recommendations may be generated and transmitted to the client(s) 220 according to the method steps disclosed herein relating to FIG. 4, where the KEI may represent a "recommendation score" for suggested content 310 to encourage the website administrator to create and rank for organic content 310, specifically around topics that answer questions people are asking on search engines.

As a non-limiting example, the website administrator may use the highest ranking result ("what is an allergy") as a title of a web page 305 featuring an article which answers the question in this highest ranking result. Thus, when Internet users search this question, an article by that name within the website 300 may rank higher in the search results for that search.

The non-limiting example embodiment in FIG. 6 illustrates an alternative embodiment for recommending keywords to be included in content 310 to improve search engine optimization for a web page 305. In this embodiment, the website admin may generate keywords by selecting a page from the control panel 315 navigation as previously disclosed or entering a URL for the web page 305 to be optimized into a provided text box.

The website admin may then select one or more URLs for one or more competitor web pages. As a non-limiting example, the website admin may select one or more websites returned as top search results with similar content.

A request may be sent to the server(s) 210 to recommend keywords based on the selected competitor websites and the server(s) 210 may use any web crawling techniques described herein or known in the art to crawl the content of the one or more selected competitor web pages to determine a quantity of repeated keywords or phrases found in the web pages. The server(s) 210 may keep a running count of the keywords, compile the keywords or phrases into a list, along with a quantity count of each keyword or phrase, rank the keywords/phrases according to this quantity count, and transmit the list of keywords/phrases to the client computer 220 for display.

As seen in FIG. 6, the website admin may choose to add these keywords, possibly by selecting the "+" sign at the right of the returned keyword list, to the website admin's saved keywords for the selected web page 305.

FIG. 7 shows the example user interface 325 for the control panel 315, in which the website admin has selected "Analyze Content" from the "Optimization Options" window within the interface 325. Two different analyses of the selected web page 305 and/or website 300 may be presented: "How you want to be seen" and "How search engines see you." For both of these analyses, the server(s) 210 may use a spider software to crawl the selected web pages 305 and provide a count of the most frequently occurring keywords or key phrases within the content 310 of the selected web page(s) 305.

The server(s) 210 may crawl the content 310 within the selected web page(s) 305, possibly using a web page crawler module (not shown). Crawling (also known as "spidering") may comprise the process of visiting one or more web pages and reading the content 310 on the web page(s) 305 on the website(s) 300 to identify keywords within the content 310. The web crawler module may visit/read the selected web page(s) 305, identify some or all keywords on each web page 305 of each website 300, and generate a list of keywords that subsequently may be displayed on the control panel 315.

The server(s)' 210 analysis of "How you want to be seen" may comprise the one or more server(s) 210 crawling the web page to conduct a page level analysis of the content of the selected web page. This page level analysis may be used to determine a count and density on the web page 305 of one or more previously saved keywords or key phrases (possibly stored in data storage 230) used to optimize the web page(s) 305 in search engine rankings.

For each of the previously saved keywords or key phrases, the server(s) 210 may crawl the selected web page(s) 305 to determine if that keyword/phrase is found in the content of that web page 305. The server may generate a list of each of the keywords/phrases with their accompanying count of occurrences on the web page 305

In addition to determining a count of the total occurrences of stored keywords/phrases included in the content of the selected web page 305, the server(s)' 210 page level analysis may also determine a "density rating" for the keyword for that web page by dividing the number of occurrences on that web page by the total number of words in the content of that page. The server(s) may then associate the density rating with the appropriate keyword/phrase in the generated list.

Once the density rating has been calculated, the server(s) 210 may assign a recommendation for optimal keyword density. For usability purposes, the server(s) 210 may assign the density rating a visual indicator of recommendation of optimal keyword density. The degree of recommendation may be determined according to a range of numbers scored by the density rating. Specifically, the keyword density may be used to determine whether keywords are optimized on the web page based on whether they are higher or lower than certain threshold numbers.

As non-limiting examples, if the keyword density is greater than 4% or less than 2%, the recommendation may be "too many occurrences" or "too few occurrences" respectively. By contrast, if the keyword density is between 2% and 4%, the density rating may be "optimal." The website admin may opt to improve the keyword density for the selected web page 305 and "Rescan" until an optimal keyword density is reached.

As with the KEI described above, the server(s) 210 may assign "visual indicators" to the density rating. As a non-limiting example, the density rating may be represented by a "sliding scale" from 1-100% of the keywords on the web page with an indicator of what percentage of those keywords are the selected keywords. The scale may be color coded so that the scale and any keyword density with too many or too few occurrences may be red while an optimal density rating may be displayed in orange yellow, green or blue.

Once the list, including the keyword/phrase, occurrence count, density, visual indicators and any color coding has been generated, the server(s) 210 may transmit the generated list for that web page 305 to the client(s) 220. The list may then be displayed on the control panel 315 as seen in FIG. 7.

As seen in FIG. 7, the analysis of "How search engines see you" may comprise a list of keywords or phrases that exist on the selected web page 305. FIG. 7 shows that the website admin may select a quantity of grouped keywords to be displayed.

The server(s) 210 may receive the quantity of grouped keywords selected by the website admin to be displayed, crawl the selected web page 305 and identify groupings of keywords according to the selected quantity of grouped keywords. The server(s) 210 may then generate a list for each grouping of the quantity of keywords, and a count of occurrences of that grouping of keywords within the content 310 of the web page 305. Using the count from the occurrences of the groupings of keywords, the server(s) 210 may then determine a keyword density for the keyword/phrase as compared with the total content of the page. If the website admin selects a single keyword quantity, "stop" words, such as a, us, you, I, etc. may be eliminated from the calculation of the total quantity of keywords/phrases for the content of the web page 305. The server(s) 210 may then transmit the generated list, including the grouped keyword or grouped phrase, the count and the keyword density to the client(s) 220 for display, as seen in FIG. 7.

In this example embodiment, there are 3 occurrences of the 3 word phrase "our allergy doctor" and 2 occurrences each of the three-word phrases "with respect and," "with integrity and," "we pledge to," "treat our patients," "to provide high," and "respect and consideration." The website admin may select any of these keyword groupings and choose to save the grouping as one of their saved keywords, possibly by selecting the "Save Keyword" link displayed in FIG. 7, as a non-limiting example. The server(s) 210 may receive the request to save these keywords and save the keywords for that web page 205, possibly in data storage 230.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A method, comprising:
  receiving, by a server computer communicatively coupled to a network, one or more keywords topically relevant to a content of a web page within a website hosted on the server computer;
  receiving, by the server computer, from a search engine:
    a first metric comprising a quantity of times the one or more keywords have appeared in a search query along with one or more question keywords during a time period, the one or more question keywords being selected from the group consisting of who, what, when, where, why and how,
    a second metric comprising a probability of receiving a high rank associated with the one or more keywords and the one or more question keywords, and
    a third metric comprising one or more questions most often asked in the search engine that include the one or more keywords and at least one of the question keywords;
  calculating, by the server computer, from the first metric and the second metric, a keyword effectiveness index;
  generating, by the server computer, one or more recommendations to include a high ranked suggested content on the web page, the high ranked suggested content identified according to the keyword effectiveness index and the third metric;

transmitting, by the server computer, to a client computer communicatively coupled to the network, the one or more recommendations;

receiving, by the server computer, a request to analyze the content of a selected web page;

performing, by the server computer, a page level analysis of the content of the selected web page;

identifying, by the server computer, on the selected web page, one or more stored keywords for optimizing the selected web page;

generating, by the server computer, a stored keyword count and density list of each of the stored one or more stored keywords; and generating, by the server computer, a keyword grouping count and density list comprising a quantity of the one or more groupings and a percentage of the one or more groupings as compared to total keywords in the content of the selected web page.

2. The method of claim 1, further comprising the steps of:
transmitting, by the server computer, to an application programming interface for the search engine:
the at least one of the question keywords;
the one or more keywords; and
a request for the first metric, the second metric and the third metric.

3. The method of claim 1, wherein the high ranked suggested content includes content that answers the one or more questions.

4. The method of claim 1, wherein:
the time period comprises a day, a week, a month or a year; and
the second metric comprises a competition metric.

5. The method of claim 1, wherein the keyword effectiveness index:
comprises a logarithm of the first metric multiplied by the difference of the second metric subtracted from 1;
is utilized to generate, organize and sequence a recommended keyword or recommended content list comprising:
one or more request results returned by the search engine; and
the first metric, the second metric and the third metric for each of the request results; and
comprises a recommendation score for each of the request results.

6. The method of claim 1, wherein the high ranked suggested content comprises a text including:
one or more frequently searched or highly ranked keywords; or
an article answering the one or more questions.

7. The method of claim 1, further comprising the steps of:
requesting, by the server computer, from the search engine:
a fourth metric comprising a quantity of times the one or more keywords have appeared in a search query during the time period; and
a fifth metric comprising a probability of receiving the high rank associated with the one or more keywords;
receiving from the search engine, by the server computer, the fourth metric and the fifth metric;
calculating, by the server computer, from the fourth metric and the fifth metric, a second keyword effectiveness index;
generating, by the server computer, one or more recommendations to include a second high ranked suggested content on the web page, the second high ranked suggested content identified according to the second keyword effectiveness index; and transmitting, by the server computer, to a client computer, the one or more recommendations.

8. The method of claim 1, further comprising the steps of:
receiving, by the server computer:
a selection of a search engine optimization option for a web page within a hosted website to limit the first metric and the second metric by one or more geographical areas and one or more languages; and
limiting, by the server computer, a plurality of request results according to the one or more geographical areas or the one or more languages.

9. The method of claim 1, further comprising the steps of:
assigning, by the server computer, a favorable recommendation to one or more request results comprising a keyword effectiveness index higher than a first predetermined number;
associating, by the server computer, a first visual indicator comprising a first color, interface element or graphic with the favorable recommendation;
assigning, by the server computer, a non-favorable recommendation to the one or more request results comprising a keyword effectiveness index lower than a second predetermined number;
associating, by the server computer, a second visual indicator comprising a color, interface element or graphic with the non-favorable recommendation;
assigning, by the server computer, an ideal or neutral recommendation to the one or more request results comprising a keyword effectiveness index between the first predetermined number and the second predetermined number;
associating, by the server computer, a third visual indicator comprising a color, interface element or graphic with the ideal or neutral recommendation; and
transmitting, by the server computer, the visual indicator to the client computer to be displayed in association with the first metric and the second metric.

10. A system, comprising a server computer communicatively coupled to a network and configured to:
receive one or more keywords topically relevant to a content of a web page within a website hosted on the server computer;
receive from a search engine:
a first metric comprising a quantity of times the one or more keywords have appeared in a search query along with one or more question keywords during a time period, the one or more question keywords being selected from the group consisting of who, what, when, where, why and how; and
a second metric comprising a probability of receiving a high rank associated with the one or more keywords and the one or more question keywords, and
a third metric comprising one or more questions most often asked in the search engine that include the one or more keywords and at least one of the question keywords;
calculate from the first metric and the second metric, a keyword effectiveness index;
generate one or more recommendations to include a high ranked suggested content on the web page, the high ranked suggested content identified according to the keyword effectiveness index and the third metric;
transmit to a client computer communicatively coupled to the network, the one or more recommendations;
assign a favorable recommendation to one or more request results comprising a keyword effectiveness index higher than a first predetermined number;

associate a first visual indicator comprising a first color, interface element or graphic with the favorable recommendation;

assign a non-favorable recommendation to the one or more request results comprising a keyword effectiveness index lower than a second predetermined number;

associate a second visual indicator comprising a color, interface element or graphic with the non-favorable recommendation;

assign an ideal or neutral recommendation to the one or more request results comprising a keyword effectiveness index between the first predetermined number and the second predetermined number;

associate a third visual indicator comprising a color, interface element or graphic with the ideal or neutral recommendation; and transmit at least one of the first visual indicator, the second visual indicator, and the third visual indicator to the client computer to be displayed in association with the first metric and the second metric.

11. The system of claim 10, wherein the server computer is further configured to:
  transmit, to an application programming interface for the search engine:
    the at least one of the question keywords;
    the one or more keywords; and
    a request for the first metric, the second metric and the third metric.

12. The system of claim 10, wherein the high ranked suggested content includes content that answers the one or more questions.

13. The system of claim 10, wherein:
  the time period comprises a day, a week, a month or a year; and
  the second metric comprises a competition metric.

14. The system of claim 10, wherein the keyword effectiveness index:
  comprises a logarithm of the first metric multiplied by the difference of the second metric subtracted from 1;
  is utilized to generate, organize and sequence a recommended keyword or recommended content list comprising:
    one or more request results returned by the search engine; and
    the first metric, the second metric and the third metric for each of the request results; and
  comprises a recommendation score for each of the request results.

15. The system of claim 10, wherein the high ranked suggested content comprises a text including:
  one or more frequently searched or highly ranked keywords; or
  an article answering the one or more questions.

16. The system of claim 10, wherein the server computer is further configured to:
  request from the search engine:
    a fourth metric comprising a quantity of times the one or more keywords have appeared in a search query during the time period; and
    a fifth metric comprising a probability of receiving the high rank associated with the one or more keywords;
  receive, from the search engine the fourth metric and the fifth metric;
  calculate, from the fourth metric and the fifth metric, a second keyword effectiveness index;
  generate one or more recommendations to include a second high ranked suggested content on the web page, the second high ranked suggested content identified according to the second keyword effectiveness index; and
  transmit to a client computer, the one or more recommendations.

17. The system of claim 10, wherein the server computer is further configured to:
  receive:
    a selection of a search engine optimization option for a web page within a hosted website to limit the first metric and the second metric by one or more geographical areas and one or more languages; and
  limit a plurality of request results according to the one or more geographical areas or the one or more languages.

18. The system of claim 10, wherein the server computer is further configured to:
  receive a request to analyze the content of a selected web page;
  perform a page level analysis of the content of the selected web page;
  identify, on the web page, one or more stored keywords for optimizing the selected web page;
  generate a stored keyword count and density list of each of the one or more stored keywords; and
  generate a keyword grouping count and density list comprising a quantity of one or more groupings and a percentage of the one or more groupings as compared to total keywords in the content of the selected web page.

* * * * *